United States Patent [19]
Kmiecik

[11] 3,831,429
[45] Aug. 27, 1974

[54] METHOD AND APPARATUS FOR TESTING LOW WATER FUEL CUT-OFF SWITCHES

[75] Inventor: Leopold J. Kmiecik, Lincolnwood, Ill.

[73] Assignee: International Telephone and Telegraph Corporation, New York, N.Y.

[22] Filed: Aug. 3, 1972

[21] Appl. No.: 277,523

[52] U.S. Cl.................. 73/1 R, 137/460, 137/521
[51] Int. Cl............................................. G01f 25/00
[58] Field of Search............... 73/1 R, 306; 340/410; 137/521, 460

[56] References Cited
UNITED STATES PATENTS
| | | | |
|---|---|---|---|
| 3,060,717 | 10/1962 | Howe | 73/1 R |
| 3,181,342 | 5/1965 | Barengoltz | 73/1 R |

*Primary Examiner*—Richard C. Queisser
*Assistant Examiner*—Denis E. Corr
*Attorney, Agent, or Firm*—J. B. Raden; D. P. Warner

[57] ABSTRACT

A method and apparatus are disclosed for use in testing or inspecting low water fuel cut-off switches used with hot water heating boilers. The low water cut-off switches employ floats which are positioned in float chambers between equalization pipes connected to the hot water boiler. To enable inspection, flow of water though the equalization tubes is restricted at the same time a drain valve is opened below the float chamber in the cut-off switch. Restriction of flow makes it possible for a vacuum release valve located above the float chamber to open and dump the water out of the float chamber thereby enabling the float to operate associated indicator means.

9 Claims, 4 Drawing Figures

METHOD AND APPARATUS FOR TESTING LOW WATER FUEL CUT-OFF SWITCHES

BACKGROUND OF THE INVENTION

1. Field of the Invention

The present invention relates to the inspection or testing of hot water heating boilers and particularly to improved means and an improved method to enable inspection of low water fuel cut-off switches used with hot water heating boilers.

2. Description of the Prior Art

It is known that every hot water heating boiler faces the possibility of a low water condition — a possibility that has been increased by the use of large capacity relief valves. Other causes of low water include unexpected leaks, inoperative primary controls, separation of the load from the boiler and similar unforseen conditions. Leading consulting engineers, contractors and code authorities now recommend a low water cut-off switch to supplement the pressure relief valve, as the only reliable way to turn off the fuel supply, stop the burner, and prevent boiler damage should a critical amount of water be lost for any reason.

Low water fuel cut-off switches are connected to boilers being serviced through upper and lower equalizing pipes. The lower equalizing pipes are coupled to the boilers at points below the minimum safe water level in order to position floats in the cut-off switches at points even with, or above, the minimum safe water level. The upper equalizing pipes are connected to the boilers at points above the connections to the lower equalizing pipes. If water in the boiler drops below a certain level, a float in the cut-off switch will drop accordingly and supply an indicating signal. The indicating signal can be used to turn off a fuel supply, to activate an alarm mechanism, to turn on a water supply, and the like.

Inspection of the low water cut-off switches is necessary in order to assure that they will function properly when needed. To enable inspection according to the prior art, a drain pipe has been installed in a vertical pipe below the lower equalizing pipe via a cross connection. Opening the drain has the effect of permitting water to flow out and when the water from the boiler is hot, sufficient vaporization occurs to produce downward flow from the upper equalization pipe to force the float down. When the water in the boiler is cold, however, the float will not drop until an excessive amount of water has been drained. To complete inspection in the latter circumstances, it is the practice in the prior art to provide means to impart mechanical pressure to depress the float. This has been supplied by a manual plunger installed through the wall of the cut-off switch or by prodding the mechanism with a screw driver or other pusher device through a test opening in the wall of the cut-off.

Inspection by depressing the mechanism may give a false indication of operability of the cut-off. For example, if the float housing is partially filled by soft mud, it may be possible to push the mechanism hard enough to push the float down in the mud and cause the alarm to operate. In actual operation, even though the water level dropped below the safe level, the float might not be heavy enough to drop sufficiently to give an indication due to the presence of the mud, and no indication of danger would be provided.

SUMMARY OF THE INVENTION

In view of the foregoing, it is an object of the present invention to provide an improved method and means of inspection of low water fuel cut-off switches on hot water heating boilers.

In order to provide for inspection of fuel cut-off switches according to the invention, velocity checks are installed on either side of the low water fuel cut-off. A first one of the velocity checks is installed in the upper equalizing pipe between the hot water boiler and the upper orifice of the cut-off switch while the second velocity check is installed in the lower equalizing pipe connected between the lower orifice of the cut-off switch and the hot water boiler. A drain valve is installed in a vertical pipe below a cross connection to the lower equalizing pipe. A vacuum breaker is installed above a cross connection to the upper equalizing pipe.

The invention functions as follows: when an inspection is to be made, the inspector opens the drain valve connecting a vertical drain pipe to the lower equalizing pipe and to the lower orifice of the cut-off switch. Water will commence to flow from the tank, through the equalizing pipes and out the drain pipe. The velocity check in the lower equalizing pipe will be forced into a closed position by the flow of water and constrict the opening to reduce the flow. Similar flow through the upper pipe will cause the upper velocity check to move into its closed position and restrict the flow of water from this direction. At this point — with cold water and absent the vacuum breaker — a column of water would remain in the pipe extending above and below the float in the low water cut-off switch and effectively preventing the cut-off switch from operating. However, with the vacuum breaker in position, the downward force of the column of water is relieved as the vacuum breaker opens, allowing air to enter at the top and permitting the column of water to flow out through the drain pipe. If the float in the low water cut-off switch is operable, it will ten drop to a position which activates the alarm and informs the inspector that the cut-off switch is operating properly.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENTS

Figure 1:
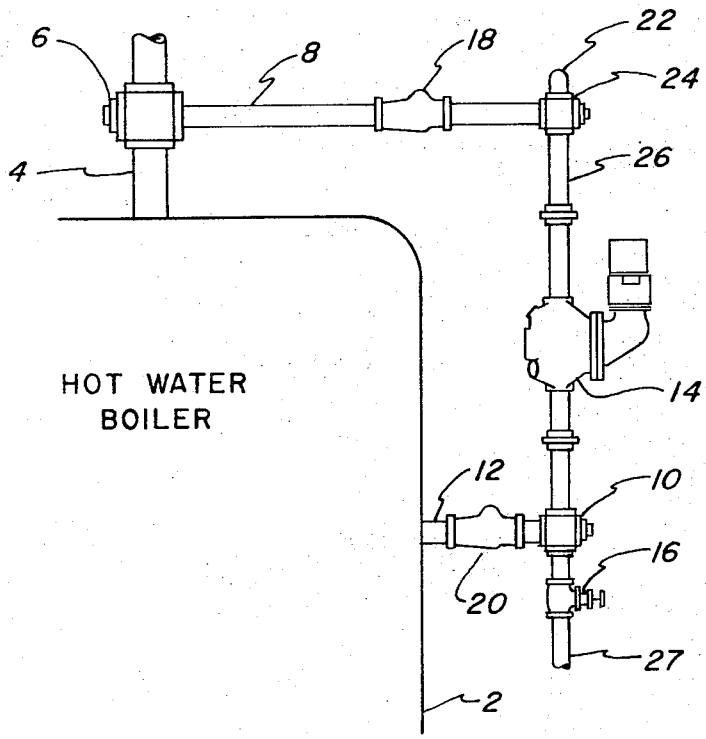
FIG. 1 is a diagram of a portion of a hot water boiler system illustrating the application of the invention.

Turning now to FIG. 1, there is shown a diagram of a hot water boiler system which makes use of the present invention.

A portion of a hot water boiler is indicated in section at 2. A conventional riser at 4 extends above the boiler to provide a connection to a radiation or compression tank (not shown). A cross connection at 6 connects to an upper equalization pipe at 8 which together with a similar cross connection at 10 and lower equalization pipe at 12 enables a low water cut-off switch at 14 to be connected to the boiler. The cut-off switch 14 is of conventional design and is used in deriving an indication when the water level in the boiler falls below a safe level. The cut-off switch can be used to reduce or cut-off the supply of fuel to burners which heat the water. The cut-off switch may also supply signals for alarm devices. A blow-off valve 16 is supplied below the cross-connection 10.

Velocity check valves are installed at 18 and 20 in the equalizer connectors 8 and 12. The check valves are normally open, making it possible to rod out the pipes 8 and 12. A vacuum release valve is included at 22, in a cross connection 24 at the upper end of the pipe 26.

Figure 2:
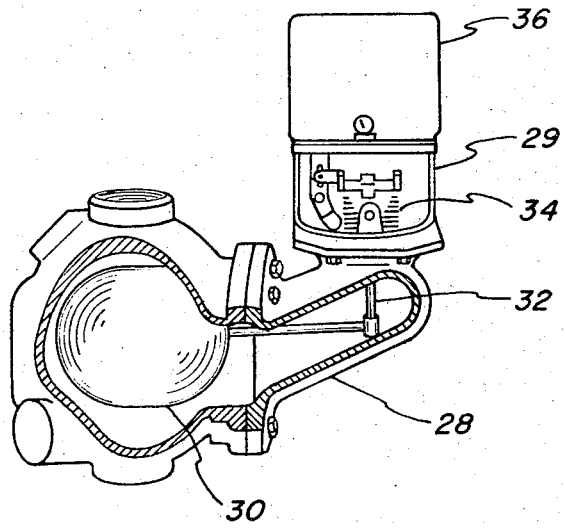
FIG. 2 is a view in partial section of a conventional low water fuel cut-off switch which the present invention is intended to test.

A typical low water fuel cut-off switch is indicated in partial section in FIG. 2. A float at 30 is connected through a linkage 32 in a housing 28, and linkage 34 in a housing 29 to operate a switch element in a box 36. A seal is provided between the housings 28 and 29 so that linkage 34 is sealed from contact with the fluids in the housing 28. The operation of the float and of the switch element in box 36 may be checked by pushing down on the linkage 34 through an opening provided in the housing 29. As indicated previously, this method of testing is not entirely satisfactory. This is due primarily to the fact that sediment below the float 30 in the housing 28, which may be depressed sufficiently by hand to activate the switch element in box 36, may nevertheless impose a barrier to normal operation of the float. In this connection, it will be recognized that the presence of a very thin sediment in the housing may prevent the relatively light float from settling and operating the linkages when the water level in the boiler drops below the safe level.

As previously indicated, the velocity check valves 18 and 20 and the vacuum release valve 22 in the combination indicated in FIG. 1 enable a more reliable test to be performed. Specifically, when the blow-off valve 16 is opened, flow in the equalizer pipes 8 and 12 will cause the velocity check valves to close down to a small flow. A column of water contained in pipe 26 and the float chamber of the low water fuel cut-off switch 14 will then exert a downward force on the vacuum release valve 22 causing it to open and drain the water out through pipe 27. The float 30 will then fall, as if the water level in the boiler 2 had fallen below the safe level. A better simulation of the behavior of the float and switch elements is attained in this way than was possible by the prior art methods.

Figure 3:
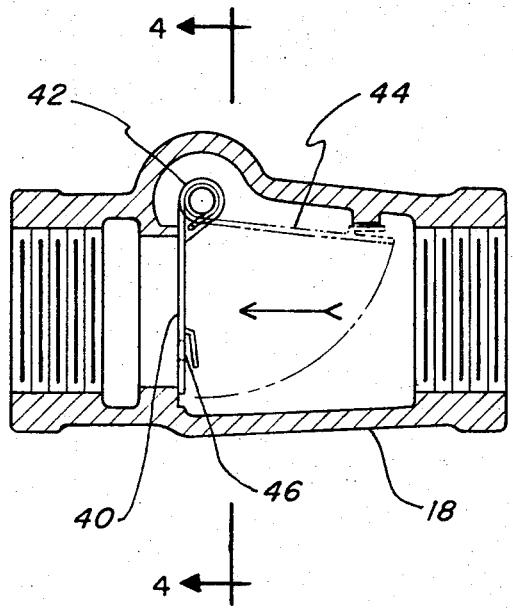
FIG. 3 is a cross section of a velocity check valve used in the practice of this invention.

A cross sectional view of an exemplary velocity check valve in accordance with the invention is shown in FIG. 3. The direction of flow of fluid in this valve is indicated by the arrow. This valve is identified as corresponding to 18 in FIG. 1. The closure element 40 will be forced, by action of the spring end 42, to assume the position of the dashed line 44 when no flow occurs through the valve. When fluid flows the valve will be closed as indicated at 40, leaving a much reduced opening at 46 through which the fluid may flow with diminished volume per unit time.

Figure 4:
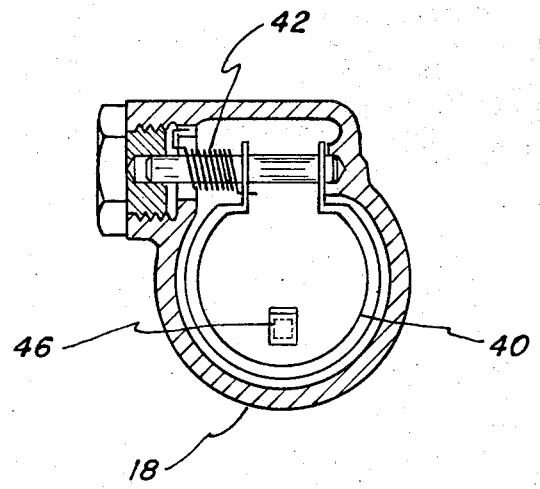
FIG. 4 is an additional view in section taken along line 4—4 of the check valve shown in FIG. 3.

An additional cross sectional view of the check valve along the lines 4 — 4 of FIG. 3 is shown in FIG. 4. In FIG. 4, the closure element 40 is shown seated in the closed position indicated also in FIG. 3. The spring 42 is shown in further detail. The relative size of the opening 46 to the open port of the velocity check is apparent from this figure. The openings 46 provide an important function in the velocity check valves by restoring equalization of pressure when the blow-off valve is reclosed after a test. Without the openings 46, the check valves might remain closed by pressure from the direction of the arrow in FIG. 3, but with these openings pressure will equalize under static conditions and the spring 42 will be able to reopen the valve.

While the principles of the invention have been described above in connection with specific apparatus and applications, it is to be understood that this description is made only by way of example and not as a limitation on the scope of the invention.

I claim:

1. In a controller unit for inspecting the operation of hot water boiler systems, a plurality of means comprising sensing means responsive to a low water level in a boiler to provide an indicating signal, upper and lower equalizing pipes connecting upper and lower parts of said sensing means to a boiler, first flow restricting means including a velocity check valve positioned in said upper equalizing pipe, second flow restricting means including a velocity check valve positioned in said lower equalizing pipe, a vacuum breaker connected to the upper equalizing pipe between the sensing means and the first flow restricting means, and draining means including a drain valve connected to the lower equalizing pipe between the sensing means and the second flow restricting means, whereby the sensing means may be inspected by opening the draining means and observing the reaction in the system.

2. A unit as claimed in claim 1, in which the sensing means includes a low water fuel cut-off switch.

3. A unit as claimed in claim 1, in which said velocity check valves are spring loaded to be normally open to permit easy clean-out by rodding of the associated equalizing pipes.

4. A unit as claimed in claim 1, in which said velocity check valves incorporate openings to permit establishment of pressure equalization when the draining means is closed.

5. A unit as claimed in claim 1, in which the velocity check valves include means permitting pressure to be equalized in said equalizing pipes when the draining means are closed, and the velocity check valves include spring means to restore the valves to an open position when the pressure is equalized.

6. A unit as claimed in claim 1, in which said velocity check valves are spring loaded to be normally open to permit easy clean-out by rodding of the associated equalizing pipes, and said velocity check valves include openings permitting restoration of equal pressure on opposite sides of the valves, enabling them to return to the normally open position after closing.

7. Apparatus as claimed in claim 1, in which the sensing means responsive to a low water level includes a float movable in a float chamber to activate signal means in response to a drop in water level in the boiler below a certain level, and said velocity check valves operate to close and limit flow to said float chamber in response to flow induced by opening said draining means.

8. Apparatus as claimed in claim 1, in which the sensing means responsive to a low water level includes a float movable in a float chamber to activate signal means in response to a drop in water level in the boiler below a certain level, said velocity check valves operate to close and limit flow to said float chamber in response to flow induced by opening said draining means, and said vacuum breaker releases fluid in said float chamber to permit said float to drop and activate the signal means.

9. Apparatus for inspecting the operation of a low water fuel cut-off switch in a hot water boiler system, in which the low water fuel cut-off switch includes a float movable in a float chamber to activate signal means in response to a drop in water level in the boiler below a certain level, comprising upper and lower equalizing pipes connecting respective upper and lower parts of a low water fuel cut-off switch to a boiler, first flow restricting means in said upper equalizing pipe, second flow restricting means in said lower equalizing pipe, the first and second flow restricting means including velocity check valves, said velocity check valves operating to close and limit flow to a float chamber in response to flow induced by opening said draining means, and said vacuum breaker releasing fluid in said float chamber to permit said float to drop and activate the signal means, a vacuum breaker connected to the upper equalizing pipe between the switch and the first flow restricting means, and draining means connected to the lower equalizing pipe between the sensing means and the second flow restricting means, whereby the operation of the switch may be inspected by operating the draining means and observing the reaction of the system.

* * * * *